US012441160B2

(12) United States Patent
Vaddiraju et al.

(10) Patent No.: US 12,441,160 B2
(45) Date of Patent: Oct. 14, 2025

(54) VEHICLE CABIN AND RECHARGEABLE ENERGY STORAGE SYSTEM HEATING

(71) Applicant: GM GLOBAL TECHNOLOGY OPERATIONS LLC, Detroit, MI (US)

(72) Inventors: Srinivasa Rao Vaddiraju, Troy, MI (US); Jeffrey A. Bozeman, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 229 days.

(21) Appl. No.: 17/521,990

(22) Filed: Nov. 9, 2021

(65) Prior Publication Data

US 2023/0147794 A1    May 11, 2023

(51) Int. Cl.
| | |
|---|---|
| B60H 1/00 | (2006.01) |
| B60H 1/03 | (2006.01) |
| B60H 1/14 | (2006.01) |
| B60L 58/26 | (2019.01) |
| B60L 58/27 | (2019.01) |
| H01M 10/613 | (2014.01) |
| H01M 10/615 | (2014.01) |

(52) U.S. Cl.
CPC ........... *B60H 1/00899* (2013.01); *B60H 1/03* (2013.01); *B60H 1/143* (2013.01); *B60L 58/26* (2019.02); *B60L 58/27* (2019.02); *H01M 10/613* (2015.04); *H01M 10/615* (2015.04); *B60H 2001/00928* (2013.01)

(58) Field of Classification Search
None
See application file for complete search history.

(56) References Cited

U.S. PATENT DOCUMENTS

| | | | |
|---|---|---|---|
| 7,975,757 B2 | 7/2011 | Nemesh et al. | |
| 9,796,241 B2 | 10/2017 | Takeuchi et al. | |
| 10,601,087 B2 | 3/2020 | Blatchley et al. | |
| 11,376,921 B2 * | 7/2022 | Kim | B60H 1/32284 |
| 11,407,273 B2 * | 8/2022 | Kim | B60H 1/00321 |

(Continued)

FOREIGN PATENT DOCUMENTS

| | | | | |
|---|---|---|---|---|
| DE | 102016121362 B4 * | 2/2023 | ......... | B60H 1/00278 |
| JP | 7185469 B2 * | 12/2022 | ......... | B60H 1/00028 |

(Continued)

OTHER PUBLICATIONS

German Office Action for German Application No. 102022123397.9; dated Nov. 28, 2023; 8 pages.

*Primary Examiner* — Jenna M Maroney
(74) *Attorney, Agent, or Firm* — CANTOR COLBURN LLP

(57) ABSTRACT

A heating, ventilation and air conditioning (HVAC) system for a vehicle having a rechargeable energy storage system includes a refrigerant circuit having a flow of refrigerant circulated therethrough. The refrigerant circuit includes a compressor, an internal condenser, and a chiller heat exchanger. A coolant circuit is fluidly connected to the refrigerant circuit and has a flow of coolant circulated therethrough. The coolant circuit includes the chiller heat exchanger, the internal condenser, a heater core, a rechargeable energy storage system (RESS), and a three-way coolant valve to selectably direct the flow of coolant through the RESS and/or along a bypass passage to bypass the RESS.

18 Claims, 3 Drawing Sheets

(56) References Cited

U.S. PATENT DOCUMENTS

| | | | |
|---|---|---|---|
| 2015/0101789 A1* | 4/2015 | Enomoto | B60H 1/039 236/35 |
| 2016/0107508 A1* | 4/2016 | Johnston | B60H 1/00278 237/12.3 A |
| 2016/0318370 A1* | 11/2016 | Rawlinson | B60H 1/32281 |
| 2016/0344075 A1* | 11/2016 | Blatchley | B60K 1/00 |
| 2020/0047626 A1* | 2/2020 | Szkrybalo | H01M 10/6568 |
| 2020/0101810 A1* | 4/2020 | Takagi | B60H 1/00028 |
| 2020/0220236 A1* | 7/2020 | Durrani | H01M 10/667 |
| 2020/0338950 A1* | 10/2020 | Kim | B60H 1/00921 |
| 2020/0384827 A1* | 12/2020 | Oh | B60H 1/32281 |
| 2020/0398641 A1* | 12/2020 | Kim | B60H 1/3227 |
| 2021/0252942 A1* | 8/2021 | Jeong | B60H 1/00278 |
| 2022/0355645 A1* | 11/2022 | Jeong | B60H 1/00664 |
| 2022/0379681 A1* | 12/2022 | Kim | B60H 1/00485 |
| 2023/0076418 A1* | 3/2023 | He | H05K 7/20881 |
| 2023/0142706 A1 | 5/2023 | Vaddiraju et al. | |

FOREIGN PATENT DOCUMENTS

| | | | |
|---|---|---|---|
| KR | 20200061460 A | * | 6/2020 |
| KR | 20200085217 A | * | 7/2020 |

* cited by examiner

VEHICLE CABIN AND RECHARGEABLE ENERGY STORAGE SYSTEM HEATING

INTRODUCTION

The subject disclosure relates to electric vehicles, and more precisely to heating of a cabin and a rechargeable energy storage system (RESS) of an electric vehicle.

A typical RESS, also known by the term a "battery pack" or other similar nomenclature has an optimal performance within a narrow temperature range. When operating conditions fall outside of this range at an upper end, the RESS is cooled by circulating a flow of coolant therethrough. When, on the other hand, the operating temperature is low, it is desired to heat RESS to maintain performance. This heating is typically achieved via a separate cooling heater connected to the system.

SUMMARY

In one embodiment, a heating, ventilation and air conditioning (HVAC) system for a vehicle having a rechargeable energy storage system includes a refrigerant circuit having a flow of refrigerant circulated therethrough. The refrigerant circuit includes a compressor, an internal condenser, and a chiller heat exchanger. A coolant circuit is fluidly connected to the refrigerant circuit and has a flow of coolant circulated therethrough. The coolant circuit includes the chiller heat exchanger, the internal condenser, a heater core, a rechargeable energy storage system (RESS), and a three-way coolant valve to selectably direct the flow of coolant through the RESS and/or along a bypass passage to bypass the RESS.

Additionally or alternatively, in this or other embodiments the refrigerant circuit and the coolant circuit exchange thermal energy at the internal condenser.

Additionally or alternatively, in this or other embodiments in a heat pump mode, the flow of refrigerant is directed through an outside heat exchanger of the refrigerant circuit, bypassing the chiller heat exchanger.

Additionally or alternatively, in this or other embodiments an outside heat exchanger expansion valve is operable to selectably direct the flow of refrigerant through the outside heat exchanger.

Additionally or alternatively, in this or other embodiments the heat pump mode is utilized when an ambient temperature is greater than −10 degrees Celsius.

Additionally or alternatively, in this or other embodiments the three-way coolant valve is located along the coolant circuit between the heater core and the chiller heat exchanger.

Additionally or alternatively, in this or other embodiments the bypass passage extends from the three-way coolant valve to a location of the coolant circuit between the RESS and the internal condenser.

Additionally or alternatively, in this or other embodiments in a RESS heating mode, the flow of refrigerant is directed through the chiller heat exchanger.

Additionally or alternatively, in this or other embodiments the RESS heating mode is utilized when an ambient air temperature is less than −10 degrees Celsius.

Additionally or alternatively, in this or other embodiments a pump circulates the flow of coolant through the coolant circuit.

Additionally or alternatively, in this or other embodiments the pump is located in the coolant circuit fluidly upstream of the internal condenser and the heater core, and fluidly downstream of the RESS.

In another embodiment, a method of heating a rechargeable energy storage system of a vehicle includes circulating a flow of refrigerant through a refrigerant circuit. The refrigerant circuit includes a compressor, an internal condenser, and a chiller heat exchanger. A flow of coolant is circulated through a coolant circuit. The coolant circuit includes the internal condenser, a heater core, and a rechargeable energy storage system (RESS). The flow of refrigerant is heated via operation of the compressor. The flow of coolant is selectably directed to one or more of the RESS and a bypass passage to bypass the RESS via a three-way coolant valve. One or more of the RESS and the heater core are heated via the flow of coolant.

Additionally or alternatively, in this or other embodiments the refrigerant circuit and the coolant circuit exchange thermal energy at the internal condenser.

Additionally or alternatively, in this or other embodiments in a heat pump mode, the flow of refrigerant is directed through an outside heat exchanger of the refrigerant circuit, bypassing the chiller heat exchanger.

Additionally or alternatively, in this or other embodiments the heat pump mode is utilized when an ambient temperature is greater than −10 degrees Celsius.

Additionally or alternatively, in this or other embodiments the three-way coolant valve is located along the coolant circuit between the heater core and the chiller heat exchanger.

Additionally or alternatively, in this or other embodiments the bypass passage extends from the three-way coolant valve to a location of the coolant circuit between the RESS and the internal condenser.

Additionally or alternatively, in this or other embodiments in a RESS heating mode, the flow of refrigerant is directed through the chiller heat exchanger.

Additionally or alternatively, in this or other embodiments the RESS heating mode is utilized when an ambient air temperature is less than −10 degrees Celsius.

Additionally or alternatively, in this or other embodiments the flow of coolant is circulated through the coolant circuit via a pump, the pump located in the coolant circuit fluidly upstream of the internal condenser and the heater core, and fluidly downstream of the RESS.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
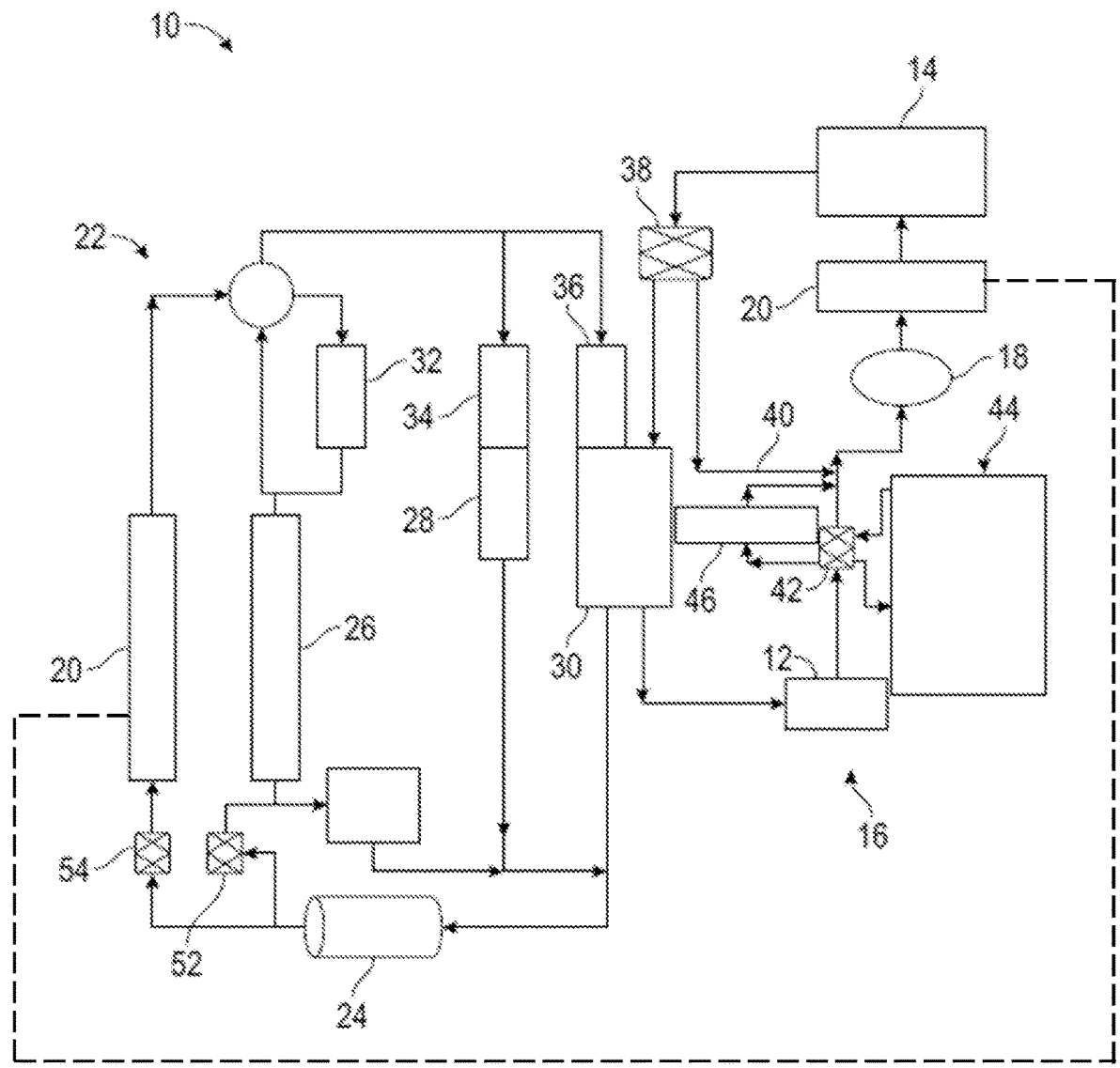
FIG. 1 is a schematic illustration of an embodiment of a heating, ventilation, and air conditioning (HVAC) system.

The following description is merely exemplary in nature and is not intended to limit the present disclosure, its application or uses. It should be understood that throughout the drawings, corresponding reference numerals indicate like or corresponding parts and features.

In accordance with an exemplary embodiment, an illustration of a heating, ventilation, and air conditioning (HVAC) system 10 for a vehicle is shown in FIG. 1. The vehicle includes a rechargeable energy storage system (RESS) 12, such as electric rechargeable traction batteries, electric double-layer capacitors or flywheel energy storage, and a heater core 14 as part of a coolant circuit 16, through which a flow of coolant is circulated. The heater core 14 is utilized for heating of a cabin of the vehicle. The flow of coolant is circulated through the coolant circuit 16 via a coolant pump 18, which in some embodiments is located between the RESS 12 and the heater core 14. An internal condenser 20 is located along the coolant circuit 16, in some embodiments between the coolant pump 18 and the heater core 14 and connects the coolant circuit 16 to a refrigerant circuit 22 arranged in parallel with the coolant circuit 16.

In the internal condenser 20, the flow of coolant of the coolant circuit 16 exchanges thermal energy with a flow of refrigerant from the refrigerant circuit 22. The refrigerant circuit 22 further includes a compressor 24 disposed fluidly upstream of the internal condenser 20, and three heat exchangers arranged in a fluidly parallel relationship downstream of the internal condenser 20. The three heat exchangers include an outside heat exchanger 26, an evaporator 28 and a chiller heat exchanger 30. Each heat exchanger has an associated expansion device located fluidly between the internal condenser 20 and the respective heat exchanger. The expansion devices are, respectively, an outside expansion valve 32, an evaporator expansion valve 34 and a chiller expansion valve 36. The chiller heat exchanger 30 is further connected to the coolant circuit 16 for thermal energy exchange between the flow of coolant and the flow of refrigerant at the chiller heat exchanger 30.

A RESS valve 42 is used to connect the coolant circuit 16 and a power electronics coolant loop 44, thereby exchanging heat between the two coolant loops on an as needed basis. In some embodiments, a coolant heater 46 can be placed between the RESS valve 42 and the pump 18 to provide additional heating to the RESS 12 and cabin on an as needed basis. Alternatively, the coolant heater 46 can be placed between chiller heat exchanger 30 and the RESS 12.

The HVAC system 10 is configured to operate in several operating modes, depending on the thermal demands of the RESS 12 and the heater core 14, and on ambient conditions and operating conditions of the vehicle, as will be discussed in greater detail below. To facilitate switching of operating modes, the HVAC system 10 includes a plurality of valves to selectably direct the flow of coolant and the flow of refrigerant along selected fluid pathways in the coolant circuit 16 and the refrigerant circuit 22. The coolant circuit 16 includes a three-way coolant valve 38 to selectably direct the flow of coolant through the chiller heat exchanger 30 and/or through a bypass passage 40 to a location between the pump 18 and the RESS 12, thus bypassing the RESS 12 and the chiller heat exchanger 30. In addition to the aforementioned expansion valves, the refrigerant circuit 22 includes an outside heat exchanger valve 52 and an internal condenser refrigerant valve 54 to selectably direct the flow of refrigerant from the compressor 24 through the outside heat exchanger 26 or through the internal condenser 20.

Figure 2:
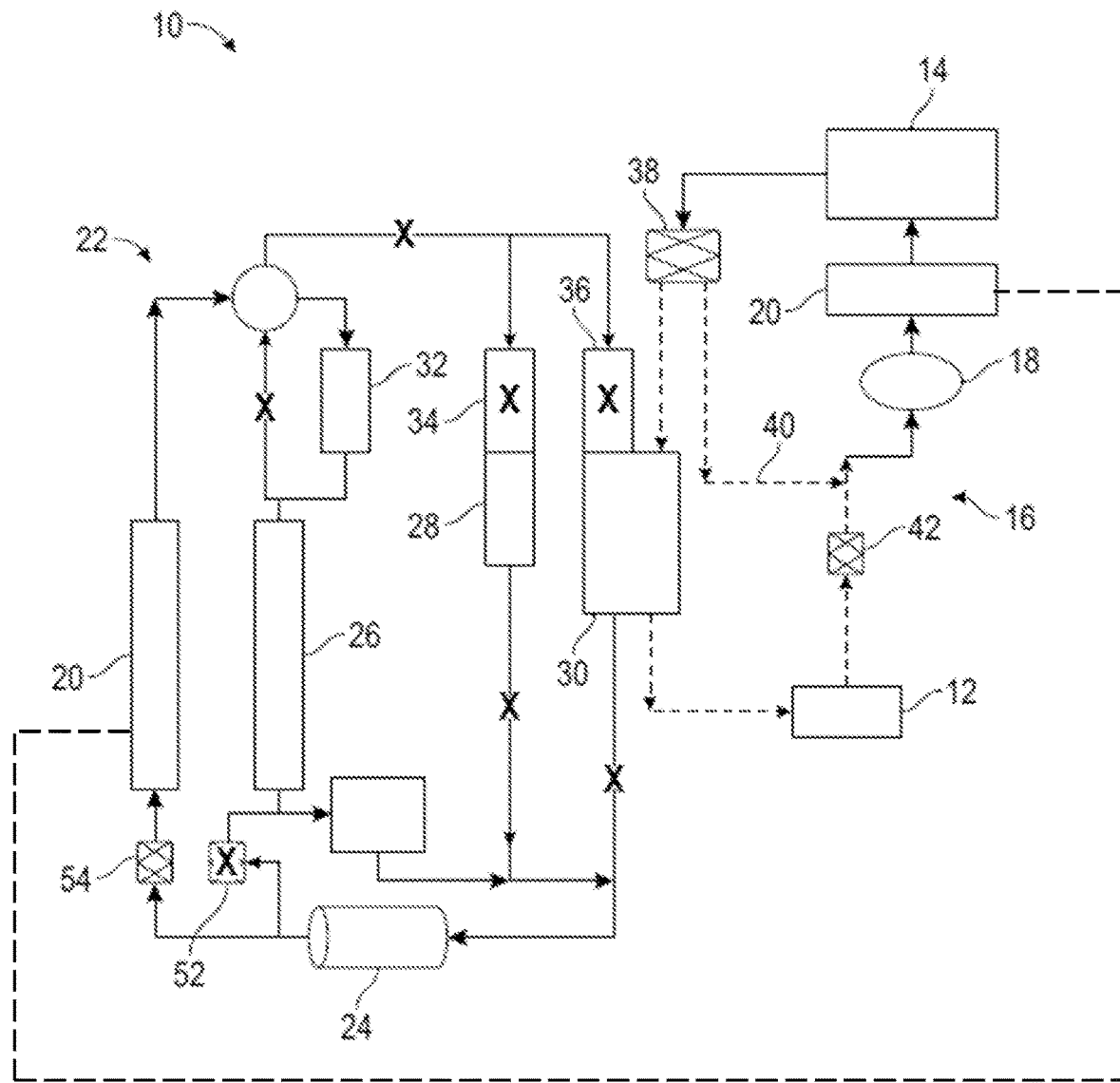
FIG. 2 is a schematic illustration of an operating mode of an HVAC system.

A first operating mode, or heat pump mode, of the HVAC system 10 is illustrated in FIG. 2. This first mode is utilized, for example, when the ambient temperature is not less than −10 degrees Celsius, and one or more of the RESS 12 or the cabin is requesting heating, with the cabin being heated via the heater core 14. In heat pump mode, the outside expansion valve 32 is opened, and the evaporator expansion valve 34, the chiller expansion valve 36, and the outside heat exchanger valve 52 are all closed. Thus, in the refrigerant circuit 22, the flow of refrigerant leaves the compressor 24 and is directed through the internal condenser 20, and then through the outside expansion valve 32 and the outside heat exchanger 26, which draws in heat from the ambient air. The flow of refrigerant bypasses the evaporator 34 and the chiller heat exchanger 30 and is returned to the compressor 24. In the coolant loop 16, thermal energy is exchanged between the flow of coolant and the flow of refrigerant at the internal condenser 20. The heated flow of coolant then flows through the heater core 14 and is selectably directed through the three-way coolant valve 38 to the RESS 12 and/or through the bypass passage 40, depending on the heating needs of the RESS 12. When heating of both the cabin and the RESS 12 are required, RESS 12 heating will be limited, otherwise the RESS 12 will act as a heat sink and pull in all of the flow of coolant to the RESS 12.

Figure 3:
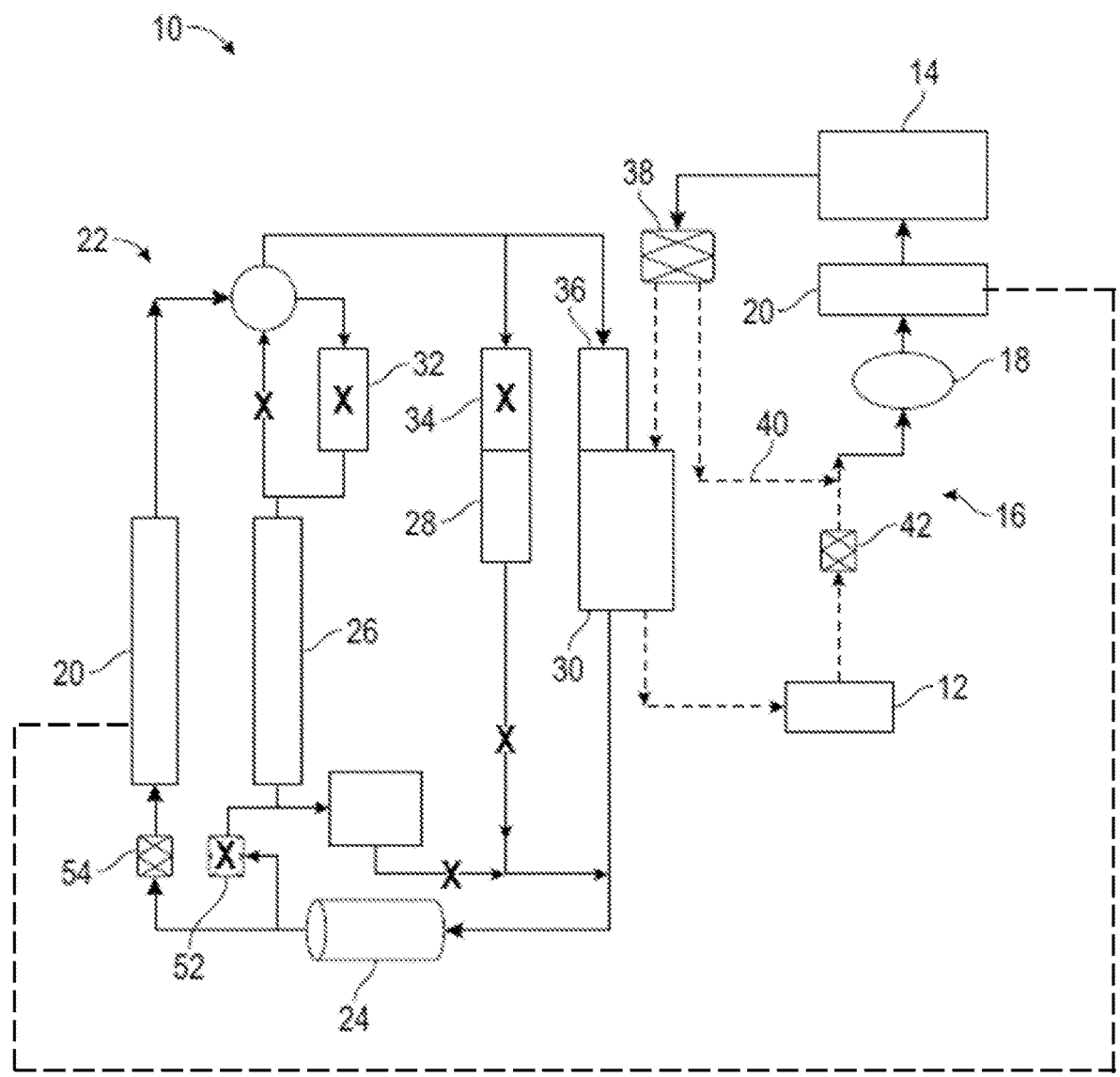
FIG. 3 is a schematic illustration of another operating mode of an HVAC system.

Referring now to FIG. 3, shown is a second operating mode, RESS heating mode, of the HVAC system 10. This second mode is utilized in cold conditions, for example, when the ambient temperature is less than −10 degrees Celsius, and one or more of the RESS 12 or the cabin is requesting heating, with the cabin being heated via the heater core 14. In RESS heating mode, the outside expansion valve 32 and the evaporator expansion valve 34 are closed, as is the outside heat exchanger valve 52. The chiller expansion valve 36 is opened, so that in the refrigerant circuit 22 the flow of refrigerant leaves the compressor 24 and is directed through the internal condenser 20, and then through the chiller expansion valve 36 and the chiller heat exchanger 30 before flowing back to the compressor 24.

In the coolant loop 16, thermal energy is exchanged between the flow of coolant and the flow of refrigerant at the internal condenser 20. The heated flow of coolant then flows through the heater core 14 and is selectably directed through the three-way coolant valve 38 to the RESS 12 and/or through the bypass passage 40, depending on the heating needs of the RESS 12. When heating of both the cabin and the RESS 12 are required, RESS 12 heating will be limited, otherwise the RESS 12 will act as a heat sink and pull in all of the flow of coolant to the RESS 12.

The use of the three-way coolant valve 38 allows modulation of the flow of coolant through the chiller heat exchanger 30 and the RESS 12, such that the RESS 12 may be heated by the flow of coolant that is waste heat not utilized by the heater core 14 for cabin heating.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A heating, ventilation and air conditioning (HVAC) system for a vehicle having a rechargeable energy storage system, comprising:
   a refrigerant circuit having a flow of refrigerant circulated therethrough, the refrigerant circuit including:
      a compressor;
      an internal condenser;
      an evaporator; and a chiller heat exchanger arranged in a fluidly parallel relationship with the evaporator; and a coolant circuit fluidly connected to the refrigerant circuit and having a flow of coolant circulated therethrough, the coolant circuit including:

the chiller heat exchanger;
the internal condenser;
a heater core;
the rechargeable energy storage system (RESS);
a coolant heater; and
a three-way coolant valve to selectably direct the flow of coolant through both the RESS and the chiller heat exchanger and along a bypass passage to bypass all of the RESS, the chiller heat exchanger and the coolant heater;
wherein the three-way coolant valve is located along the coolant circuit between the heater core and the chiller heat exchanger; and
further comprising a power electronics coolant loop fluidly connected to the coolant circuit;
wherein the flow of coolant is selectably directed through the power electronics coolant loop via a RESS valve positioned fluidly downstream of the RESS.

2. The HVAC system of claim 1, wherein the refrigerant circuit and the coolant circuit exchange thermal energy at the internal condenser.

3. The HVAC system of claim 1, wherein in a heat pump mode, the flow of refrigerant is directed through an outside heat exchanger of the refrigerant circuit, bypassing the chiller heat exchanger.

4. The HVAC system of claim 3, further comprising an outside heat exchanger expansion valve operable to selectably direct the flow of refrigerant through the outside heat exchanger.

5. The HVAC system of claim 3, wherein the heat pump mode is utilized when an ambient temperature is greater than -10 degrees Celsius.

6. The HVAC system of claim 1, wherein the bypass passage extends from the three-way coolant valve to a location of the coolant circuit between the RESS and the internal condenser.

7. The HVAC system of claim 1, wherein in a RESS heating mode, the flow of refrigerant is directed through the chiller heat exchanger.

8. The HVAC system of claim 7, wherein the RESS heating mode is utilized when an ambient air temperature is less than -10 degrees Celsius.

9. The HVAC system of claim 1, further comprising a pump to circulate the flow of coolant through the coolant circuit.

10. The HVAC system of claim 9, wherein the pump is located in the coolant circuit fluidly upstream of the internal condenser and the heater core, and fluidly downstream of the RESS.

11. A method of heating a rechargeable energy storage system of a vehicle comprising:

circulating a flow of refrigerant through a refrigerant circuit, the refrigerant circuit including:
a compressor;
an internal condenser;
an evaporator; and
a chiller heat exchanger arranged in a fluidly parallel relationship with the evaporator;
circulating a flow of coolant through a coolant circuit, the coolant circuit including:
the chiller heat exchanger;
the internal condenser;
a heater core;
the rechargeable energy storage system (RESS);
a coolant heater; and
a power electronics coolant loop fluidly connected to the coolant circuit;
heating the flow of refrigerant via operation of the compressor;
selectably directing the flow of coolant to both the RESS and the chiller heat exchanger and along a bypass passage to bypass all of the RESS, the chiller heat exchanger and the coolant heater via a three-way coolant valve; and
heating one or more of the RESS and the heater core via the flow of coolant;
wherein the three-way coolant valve is located along the coolant circuit between the heater core and the chiller heat exchanger;
wherein the flow of coolant is selectably directed through the power electronics coolant loop via a RESS valve positioned fluidly downstream of the RESS.

12. The method of claim 11, wherein the refrigerant circuit and the coolant circuit exchange thermal energy at the internal condenser.

13. The method of claim 11, wherein in a heat pump mode, the flow of refrigerant is directed through an outside heat exchanger of the refrigerant circuit, bypassing the chiller heat exchanger.

14. The method of claim 11, wherein the heat pump mode is utilized when an ambient temperature is greater than -10 degrees Celsius.

15. The method of claim 11, wherein the bypass passage extends from the three-way coolant valve to a location of the coolant circuit between the RESS and the internal condenser.

16. The method of claim 11, wherein in a RESS heating mode, the flow of refrigerant is directed through the chiller heat exchanger.

17. The method of claim 16, wherein the RESS heating mode is utilized when an ambient air temperature is less than -10 degrees Celsius.

18. The method of claim 11, further comprising circulating the flow of coolant through the coolant circuit via a pump, the pump located in the coolant circuit fluidly upstream of the internal condenser and the heater core, and fluidly downstream of the RESS.

* * * * *